US008935380B2

(12) United States Patent
Arnott et al.

(10) Patent No.: US 8,935,380 B2
(45) Date of Patent: Jan. 13, 2015

(54) AUTOMATED PRODUCT KNOWLEDGE CATALOG

(75) Inventors: Michael S. Arnott, Brisbane (AU); Rex G. Martin, Plano, TX (US)

(73) Assignee: Oracle America, Inc., Redwood City, CA (US)

( * ) Notice: Subject to any disclaimer, the term of this patent is extended or adjusted under 35 U.S.C. 154(b) by 2406 days.

(21) Appl. No.: 11/534,569

(22) Filed: Sep. 22, 2006

(65) Prior Publication Data

US 2008/0077603 A1    Mar. 27, 2008

(51) Int. Cl.
*G06F 15/16* (2006.01)
*G06F 21/57* (2013.01)

(52) U.S. Cl.
CPC ................................. *G06F 21/577* (2013.01)
USPC ................................ 709/224; 370/230; 705/4

(58) Field of Classification Search
CPC .................................................. H04L 63/1433
USPC .......................................................... 709/224
See application file for complete search history.

(56) References Cited

U.S. PATENT DOCUMENTS

| | | | | |
|---|---|---|---|---|
| 2002/0049738 A1* | 4/2002 | Epstein | ............................. | 707/1 |
| 2002/0053020 A1* | 5/2002 | Teijido et al. | ................. | 713/153 |
| 2003/0172017 A1* | 9/2003 | Feingold et al. | ................ | 705/35 |
| 2004/0054764 A1* | 3/2004 | Aderton et al. | ............... | 709/223 |
| 2004/0153663 A1* | 8/2004 | Clark et al. | .................... | 713/200 |
| 2004/0193870 A1* | 9/2004 | Redlich et al. | ................ | 713/154 |
| 2004/0210500 A1* | 10/2004 | Sobel et al. | ..................... | 705/35 |
| 2004/0215551 A1* | 10/2004 | Eder | ............................... | 705/38 |
| 2004/0267660 A1* | 12/2004 | Greenwood et al. | ............ | 705/38 |
| 2005/0038827 A1* | 2/2005 | Hooks | ........................... | 707/200 |
| 2005/0071217 A1* | 3/2005 | Hoogs et al. | .................... | 705/10 |
| 2005/0114186 A1* | 5/2005 | Heinrich | .......................... | 705/7 |
| 2005/0144480 A1* | 6/2005 | Kim et al. | ..................... | 713/201 |
| 2006/0104202 A1* | 5/2006 | Reiner | .......................... | 370/230 |
| 2006/0150008 A1* | 7/2006 | Srinivas et al. | ................. | 714/12 |
| 2006/0168473 A1* | 7/2006 | Sahoo et al. | .................... | 714/15 |
| 2006/0195905 A1* | 8/2006 | Fudge | ............................. | 726/25 |
| 2006/0265324 A1* | 11/2006 | Leclerc et al. | .................. | 705/38 |
| 2006/0265751 A1* | 11/2006 | Cosquer et al. | .................. | 726/25 |
| 2007/0038485 A1* | 2/2007 | Yeransian et al. | ................ | 705/4 |
| 2007/0067848 A1* | 3/2007 | Gustave et al. | ................. | 726/25 |
| 2007/0143390 A1* | 6/2007 | Giambalvo et al. | ........... | 709/200 |
| 2008/0027789 A1* | 1/2008 | Busch et al. | .................... | 705/11 |

* cited by examiner

*Primary Examiner* — Hamza Algibhah
(74) *Attorney, Agent, or Firm* — Marsh Fischmann & Breyfogle LLP; Kent A. Lembke

(57) ABSTRACT

A product catalog is associated with a rules service allowing administrators to conduct examinations of a computer system's health. Rules services establish a set of rules to be run against a particular computer system and thereafter invoke a rules engine. The rules service accesses a product catalog to supply product reference data regarding each component of interest in the computer system. The product reference data supplies to the rules service structure and characteristics of the component's telemetry data as well as factors to consider with regard to component interaction. Once supplied with the product reference and input data the rules service conducts the analysis. When reference data is not available or fails to match parsed input data, a search is conducted to identify and retrieve reference data matching the structure and characteristics of the parsed input data. Upon finding a match the product catalog is updated with the new information.

3 Claims, 3 Drawing Sheets

AUTOMATED PRODUCT KNOWLEDGE CATALOG

RELATED APPLICATIONS

This application is related to commonly assigned U.S. patent application Ser. No. 10/318,826 entitled, "Check Creation and Maintenance for Product Knowledge Management," commonly assigned U.S. patent application Ser. No. 10/318,702 entitled, "Product Knowledge Management," and commonly assigned U.S. patent application Ser. No. 10/319,015, entitled, "Checks for Product Knowledge Management," all of which were filed on Dec. 13, 2002. This application is also related to commonly assigned U.S. patent application Ser. No. 11/499,353, entitled "Method and System for Community Rule Development" filed on Aug. 4, 2006.

BACKGROUND OF THE INVENTION

1. Field of the Invention

Embodiments of the present invention relate, in general, to product knowledge management and particularly to a product catalog used in conjunction with a rules service for computer system risk analysis.

2. Relevant Background

With the growing deployment of computer systems and software, applications often operate in distributed, heterogeneous environments employing a variety of components. Data centers, as they are often referred to, are responsible for the maintenance and handling of information critical to the success of an enterprise. The critical nature of the data and services such data centers provide, necessitate that they operate with a high degree of integrity, functionality and reliability. Furthermore, the configuration of such a complex environment may impact many quality of service factors such as consistency, availability, serviceability, security and data loss. Due to the severe time constraints imposed by rapid deployment, and the increasing pressure from customers on suppliers to provide solutions correctly out of the box, quick identification and resolution of system configuration issues is critical.

Numerous problems can arise while attempting to identify potential issues with a system. The oversight and management of systems, especially in complex networked environments, may rely heavily on the knowledge of system administrators and/or experts from the system service provider(s). These individuals are often charged with not only maintaining physical servers and connections, but also ensuring that applications are running optimally, interface well with one another, and can communicate to outside systems and networks. In an effort to utilize a repeatable process derived from that knowledge, checklists, operational procedures, rules, or other similar documentation can be developed. In addition, software, equipment, and services exist to monitor environmental conditions, physical and remote threats, applications, power usage, and the like, to manage space and assess the data center's overall health.

One example of an engine to assess a system's overall health can be found in co-assigned U.S. patent application Ser. No. 11/499,353 entitled, "Method and System for Community Rule Development" filed on Aug. 4, 2006. Such methods and systems employ a shared body of rules that examine a system to discover if conflicts between operating systems and applications exist as well as providing suggestions of patch and configuration changes to alleviate or minimize such conflicts. A rules application selects what rules are to be run according to a configuration versus applicability analysis. Within most rule bases a rule is applicable if it meets certain conditions. A system administrator or computer expert then selects a rules service deemed applicable (or not applicable) to a system or data center of interest. For example, a system administrator may wish to select and execute certain applicable rules on a periodic basis that provide him or her with information relating to particular applications whether there are updates or patches that should be installed, past patches or updates have been found to be bad and now recommended to be withdrawn, security concerns, disk and firmware updates, and so forth. Rule and rules service selection can be based on several criteria including a rule rating that provides the administrator with insight as to the reliability and usefulness of the rule. Thereafter the rules service applies the selected rules to input data collected from the data center to ascertain a health rating for the system.

The application of rules services is based on knowledge assets allowing the service to represent the data center in concept and design without forcing the asset to fit a model that doesn't accurately represent the system. Generally, as a rule is run, a parser analyzes input data and thereafter identifies referential data through what is generally referred to as an Explorer data function. The collection and parsing of data therefore is tied to the rule or rules selected. The numerous number of data centers seeking such risk or health analysis produces a multitude of components and application combinations. As the systems become more and more complex the ability for even the most skilled professional to keep track of the interactions between components and services, and to maintain the system in optimal condition becomes a challenge. Furthermore, the complexity of the systems being analyzed results in a considerable expenditure of resources for the input data to be parsed and explored so as to provide the reference data for analysis. There is no standardization across the computing industry as how to identify a particular product based on the data that is produced. Each component produces unique telemetry streams. To understand the stream you must know how it is being generated, its structure, and its characteristics. In addition, each particular product produces information whose value is determined, in some part, by the rule being applied. The technical designation and identification of the pertinent data may be lost on a business user or even a system administrator but is nonetheless critical to the successful execution of a particular rule.

For example, a system administrator may select a rules service to be run to analyze the health of a particular system. This system possesses a certain operating system running on several hardware components as well as several end user software applications. Currently, processing the rule necessitates parsing the input data to identify patterns and characteristics and thereafter pulling information from various repositories regarding each component. Based on the type of hardware components or software being examined, only one particular patch may be appropriate, but there can be several other considerations that the administrator should be aware. This is a tedious and expensive process as the explore functionality must be accomplished during each instantiation of each particular rule.

To properly assess the health of a system each component and application comprising the system relevant to the selected rules must be accurately identified. Yet to provide this analysis in a timely and efficient manner this identification must be conducted in a way that allows a rule to access component features and characteristics without having input data parsed and analyzed upon each rule enactment. The exploration of referential data for the purposes of providing to the rules engine product reference data is time consuming and a needless waste of valuable computing resources.

SUMMARY OF THE INVENTION

Briefly stated, embodiments of the present invention involve a product catalog for use with a rules service. Rules services allow system administrators and managers of computer systems to conduct various examinations regarding the health of that system. One such examination is a risk analysis for the purposes of preemptive mitigation of computer system failures. Rules services provide a means to the administrator to establish a set of rules to be run against a particular computer system and then invoke a rules engine to conduct an analysis based on these rules. According to one embodiment of the present invention, the rules service accesses a product catalog to supply to the rules service, and ultimately to the rule engine, product reference data regarding each component of interest in the computer system.

The product catalog provides the rules service with reference data specific to a piece of hardware or software utilized in the computer system of interest. Significantly, the product catalog references each product by a product key that is both user consumable as well as machine consumable. As products are often listed and known under various titles and designations, the product catalog serves as a central location to cross reference the various designations and provides to the rules service reference data essential to the completion of any particular rule. The product reference data supplied by the product catalog identifies to the rules engine data telemetry specifics as well as factors that should be considered when interacting with other components.

In one embodiment of the present invention, a method for executing a rules service using a product catalog identifies at least one rule to conduct an analysis of a computer system. Using the rule and its list of one or more components of the computer system, the rules service accesses the product catalog to ascertain product reference data about each of the pertinent listed components. Input data about the computer system of interest is collected and parsed and is then compared to the product reference data. When the parsed input data is correlated to the product reference data, the rules engine executes the rule and conducts the analysis. When the parsed input data fails to correlate with the supplied product reference data, a search is conducted for product reference data matching the structure and characteristics of the parsed input data. Once a match is found, and in one embodiment of the present invention, the product catalog is updated with the newly found information.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
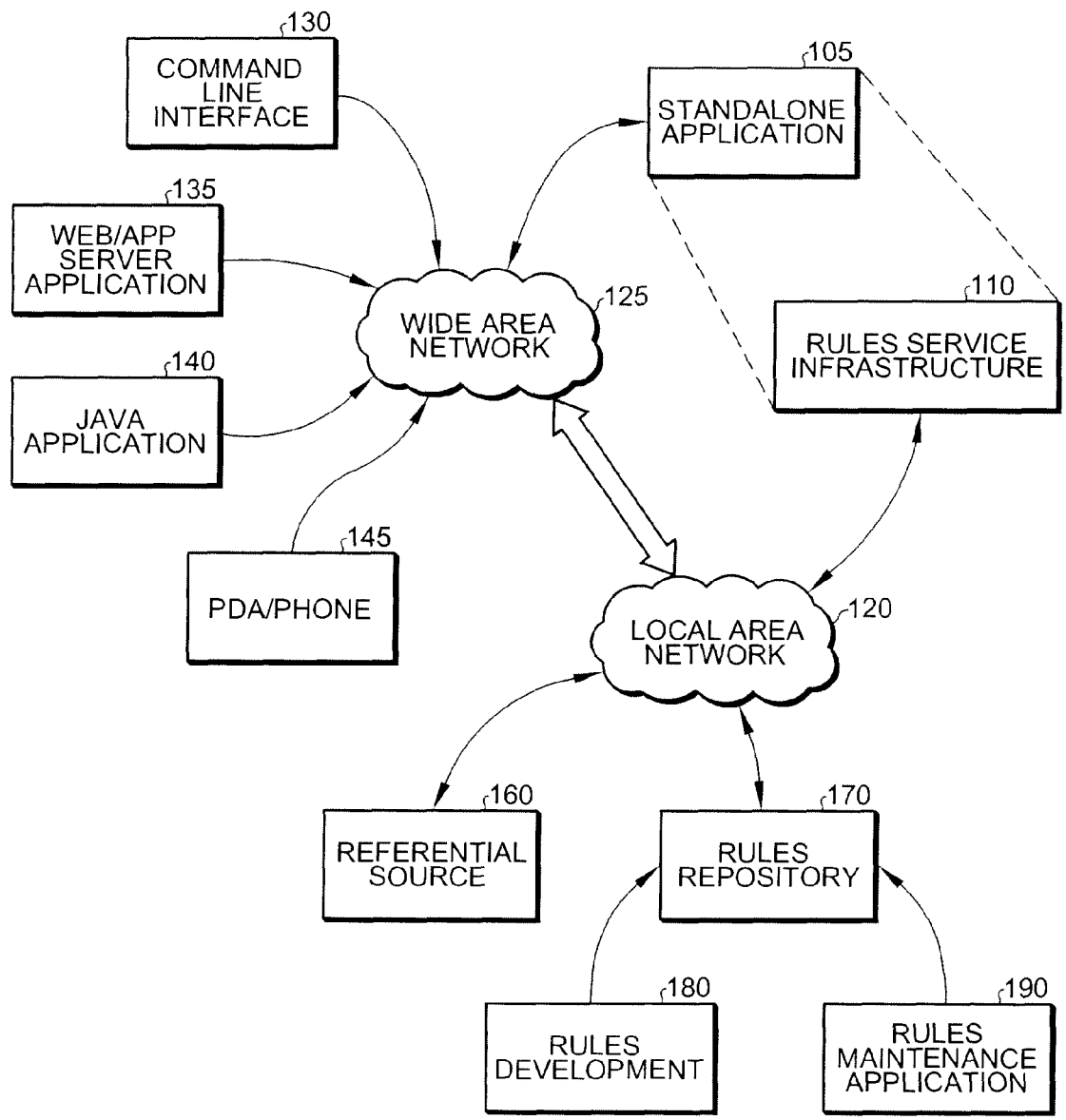
FIG. 1 shows a high level block diagram of a computer network architecture as is known in the prior art in which one embodiment of the present invention can operate.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Rules services encompass a broad base of applications. In computer science a rule can be a simple process in which a certain set of criteria is effectuated against a given computer system comprised of software and hardware components. Rules associated with risk analysis are examples of such criteria. According to one embodiment of the present invention, a risk analysis rules service examines a computer system based on rules selected by a system administrator or an information technology professional. The selected rules set certain criteria for the operation and interaction of the several components comprising the computer system. The analysis determines whether the actual interaction and operation of the system, as indicated by data collected from the system, is in compliance with current operating guidelines set forth by reference material. The rules service server thus must collect both input data from the system and reference data regarding the components of the system. Thereafter a comparison is conducted according to the criteria set forth in the rules set.

As previously discussed, one significant task of a rules service engine is the collection of reference data for each component of interest in the computer system. According to one embodiment of the present invention, the rules, upon selection by a system administrator or other individual crafting a rules set, are associated with applicable product reference data factors and considerations, via a product catalog. Absent such a catalog the rules service engine would be required to examine input data for patterns and characteristics that would identify that data as coming from a particular product. Then the rules service engine would have to explore various resources so as to provide the necessary reference data for the completion of the analysis. The present invention significantly increases the efficiency of the operation of a rules service engine.

FIG. 1 shows a high level block diagram of a computer network architecture in which one embodiment of the present invention can operate. A standalone application 105, that, in one embodiment, can be a rules service application possessing a rules service infrastructure 110 consistent with embodiments of the present invention is associated with at least one network 120, 125. In this depiction two networks are shown representing one embodiment of a relationship between a local area network 120 such as a token ring, Intranet, or an Ethernet network, and a wide area network including public networks such as the Internet. One skilled in the relevant art will appreciate that while FIG. 1 depicts two networks that are in communication with one another, the networks can be in reality a single network providing the same communication and interaction capabilities.

In the example shown in FIG. 1, the wide area network 125 serves as a communication conduit for a variety of applications and components including personal data assistants and phones 145, JAVA® applications 140, and Web or application server based applications 135. In addition the wide area network 125 can receive commands from a command line interface 130. A rules server application, running on a rules service infrastructure 110, can interact with each of these applications and/or components to provide, in one example, a risk analysis.

In one example of a rules service architecture, the rules service infrastructure 110 communicates with referential sources 160 and a rules repository 170 via a local area network 120. The rules repository is generally comprised of a rules development 180 and a rules maintenance application 190.

Figure 2:
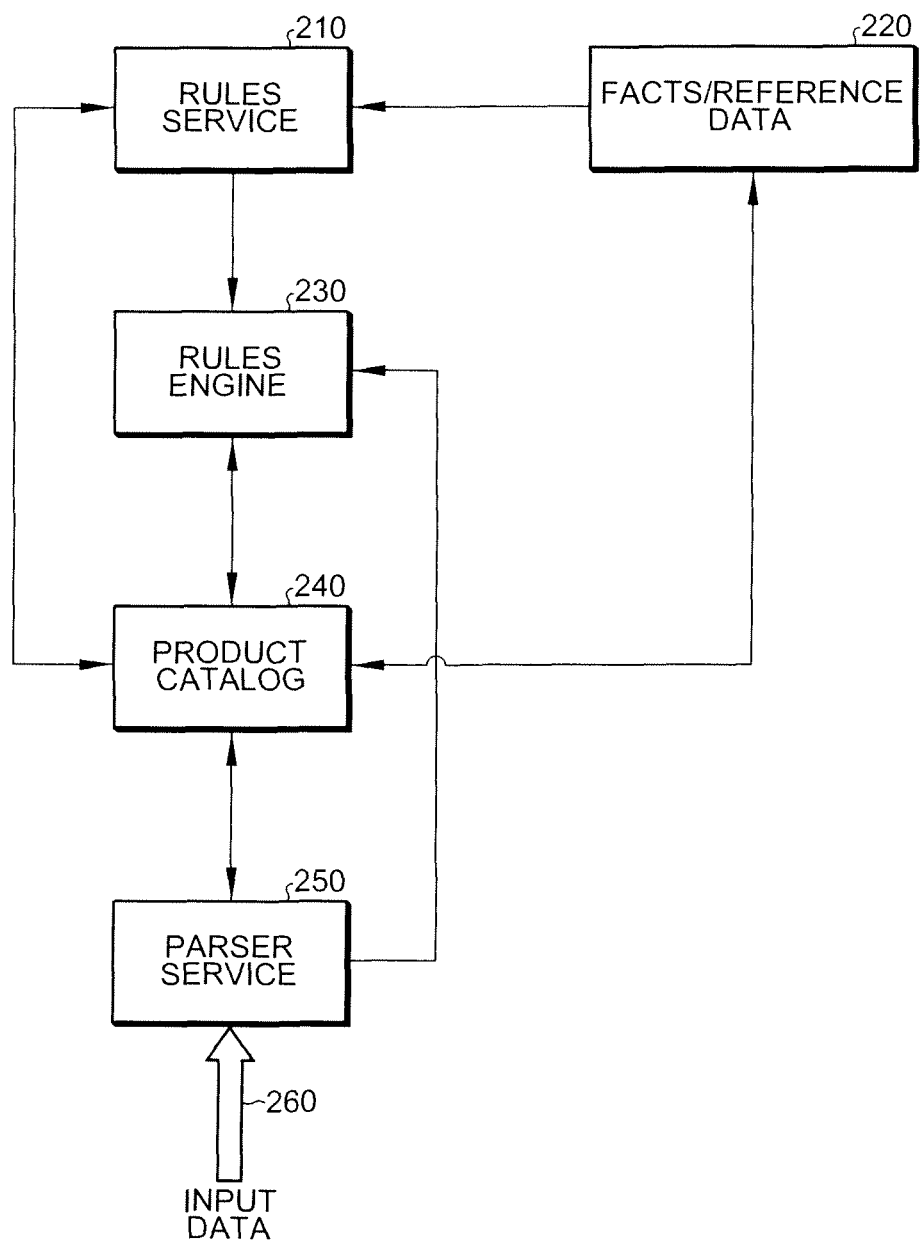
FIG. 2 shows a high level block diagram of a rules service infrastructure using a product catalog according to one embodiment of the present invention.

FIG. 2 shows a high level block diagram of a rules service infrastructure using a product catalog according to one embodiment of the present invention. According to this embodiment, the rules service infrastructure 110 comprises a rules service 210, a rules engine 230, a product catalog 240, a parser service 250 and a database possessing facts and reference data 220. The rules service 210 is generally responsible for the construction and maintenance of a rule set. A computer system administrator, general manager, information technology specialist, or some other individual affiliated and/or familiar with the computer system in question develops a set of rules pertinent to the computer system in question.

In one embodiment of the present invention, the rules service communicates with the product catalog during the selection of particular rules. For example, a system administrator may wise to provide a rule to ascertain if the operating system that is currently installed on his or her system is up to date and whether any patches need to be installed or whether previously installed patches are no longer current and need to be removed. In doing so the rules service 210, in this embodiment, can direct the user to identify the operating system by name and version as well as the type of hardware components on which the software is being run. For example one server associated with the system may be known to the administrator as Sunfire® 6800 running Solaris 9®. Once a component has been designated in a rule, the rules service 210 communicates with the product catalog 240 to determine whether a product under the name of Sunfire 6800 exists. The product catalog 240 returns to the rules service 210 information that a server named Sun Fire 6800 (aka Sunfire 6800) exists in the catalog and is hereafter referred to under its product key of sun_sf6800. As can be appreciated by one skilled in the art, a component is often referred to under several pseudonyms. The use of pseudo code as a product key allows the component to be readily identifiable to both the user, in a human consumable form, and to the rules service 210 in machine consumable form. Abbreviations, acronyms, slang, engineer designations and other references to the same product often result in a component being mis-designated expending valuable computing resources to properly identify the component.

The product catalog 240 identifies to the rules service 210 contributing factors about the product. In this example the Sun Fire 6800 is identified in the product catalog as a server that is entry level. The Sun Fire 6800 is explorer compatible and is beyond its projected end of life date. A URL for additional data is provided as is contact information for this particular product. The product catalog 240 also provides that it is listed under the category of a Sun UltraSPARC III that does not support versions 2.5.1, 2.6, and 2.7 of Solaris. However versions 8, 9 and 10 of Solaris are supported. Furthermore, the product catalog 240 provides the rules service 210 with telemetry information pertaining to the structure and protocols that the rules engine 230 should expect from a Sun Fire 6800.

In addition to data possessed in the product catalog 240 the now identified Sun Fire 6800 is communicated to a Facts/Reference database 220 that can supply additional information to the rules service 210 as needed to run the rule. This information can include other key structural indices and aspects of data that are unique to a particular product. In a similar fashion, the rules service 210 acquires and associates available product reference data for all of the components of the computer system pertinent to the selected set of rules. Upon execution of the rule, the rule set, along with the acquired product reference data, is passed to the rules service 210 and rules engine 230 that a certain product will be used in some conditional way. In a similar manner the rules engine 230 communicates with the parser service 250 to look for certain telemetry data regarding designated products. The rules engine 230 thereafter executes the rules by comparing actual input data 260 from the computer system to the various product reference data:

Prior to the comparison, the input data 260 is first passed to a parser service 250 that analyzes the data so as to identify key structural and identity aspects as highlighted by the product key. Parsed information data is thereafter communicated to the rules engine 230 where it is correlated with the information obtained from the product catalog. According to one embodiment of the present invention, the rules engine can then run the applicable rules and produce a report regarding the computer system that is user consumable. Typically the report will include the status of any patches or updates. In addition several alerts or warnings may be conveyed to the user that, based on the current condition of the user's system, he or she may want to consider and take proactive measures to safeguard or improve the system.

In another embodiment of the present invention the information provided to the rules service 210 by the product catalog 240 may be incomplete. One or more factors of the product may have been absent from the catalog 240 or the catalog may have been unable to recognize the user's designation of the product. In such a situation the rules engine 230 examines the parsed input data 260 and explores both the fact and reference database 220 as well as other referential sources 160 to identify data associated with the product of interest. The invocation of an explorer task such as this to identify a product by the data it produces is difficult and time consuming. Thus, the present invention provides ample savings in computing resources by identifying the component and its data structure prior to the rules engine 230 receiving input data 260.

Once the explore functionality of the rules engine 230 matches the parsed input data 260 with product reference data of a product, that product is associated with a particular component of the computer system. Thereafter the product reference data of that component is used in the comparison of the input data 260 to determine the results of the rule. In addition to the rule now being able to run, the data obtained by the explorer is used to update the product catalog. In one embodiment of the present invention the product identified by the explorer is present in the product catalog 240 but the designation employed by the user was not affiliated with the product. Accordingly the new alternative designation is added to the product catalog so as to preclude a similar calling of the explorer function.

In another embodiment of the present invention, a product matching the user's designation of a component is again absent from the product catalog 240. Again the explorer function is invoked resulting in a product and its associated product reference data being identified. As this particular product is unknown to the product catalog 240, a new entry in the catalog 240 is created. This creation can occur during the running of a rule, at a predetermined time, or over designated intervals. Furthermore, the new entry into the product catalog can be designated as provisional until it is reviewed and confirmed as a legitimate product catalog entry. Thus, the product catalog is an evolving resource. As more and more rules access and use the catalog 240, the catalog's ability to identify products and provide to the rules service 210 and the rules engine 230 the data that they need grows.

Yet another aspect of the present invention is the product catalog's ability to include additional contributing factors about each product. As previously discussed a rule examines a particular facet of a computer system's operation. In some cases the results of a rule may provide information about a particular product that is pertinent to other rules and instances of that particular component. For example, perhaps after a rule is run the rules engine 230 identifies that one version of a component is incompatible with one version of another component. According to one embodiment of the present invention, the product catalog 240 entry for both products would be updated to provide the rules engine 230 with information relating to the incompatibility. In further running of the rules, should the same or similar combination of components be designated by the user, information can be presented to the user regarding the known incompatibility prior to a rule being run.

The product catalog 240 provides the user and the rules service 210 resources of product reference data and contributing factors that are normalized. It will be recognized by one skilled in the art that the product catalog 240 provides multiple avenues to the rules service 210 by which to identify a component. While the product key and common vernacular is clearly the most likely scenario by which a product may be identified, any of the contributing factors or structural aspects of the component that are associated with the component in the product catalog 240 can be used by the rules service 210 to identify the product.

Another aspect of the present invention is the ability of a business user, or one not familiar with the technical aspects of the components that comprise a computer system, with the ability to select rules to examine the health of a system. The user may wish to examine an instance of a Sun Fire V880. From the user's perspective the product catalog provides him or her with enough information to correctly identify that the product in the computer system of interest is a Sun Fire V880. From the parser's perspective, the product catalog provides to the parser and rules engine information regarding the source. The product catalog therefore represents a central source or product information that is available to a plurality of users, technical and business alike.

Figure 3:
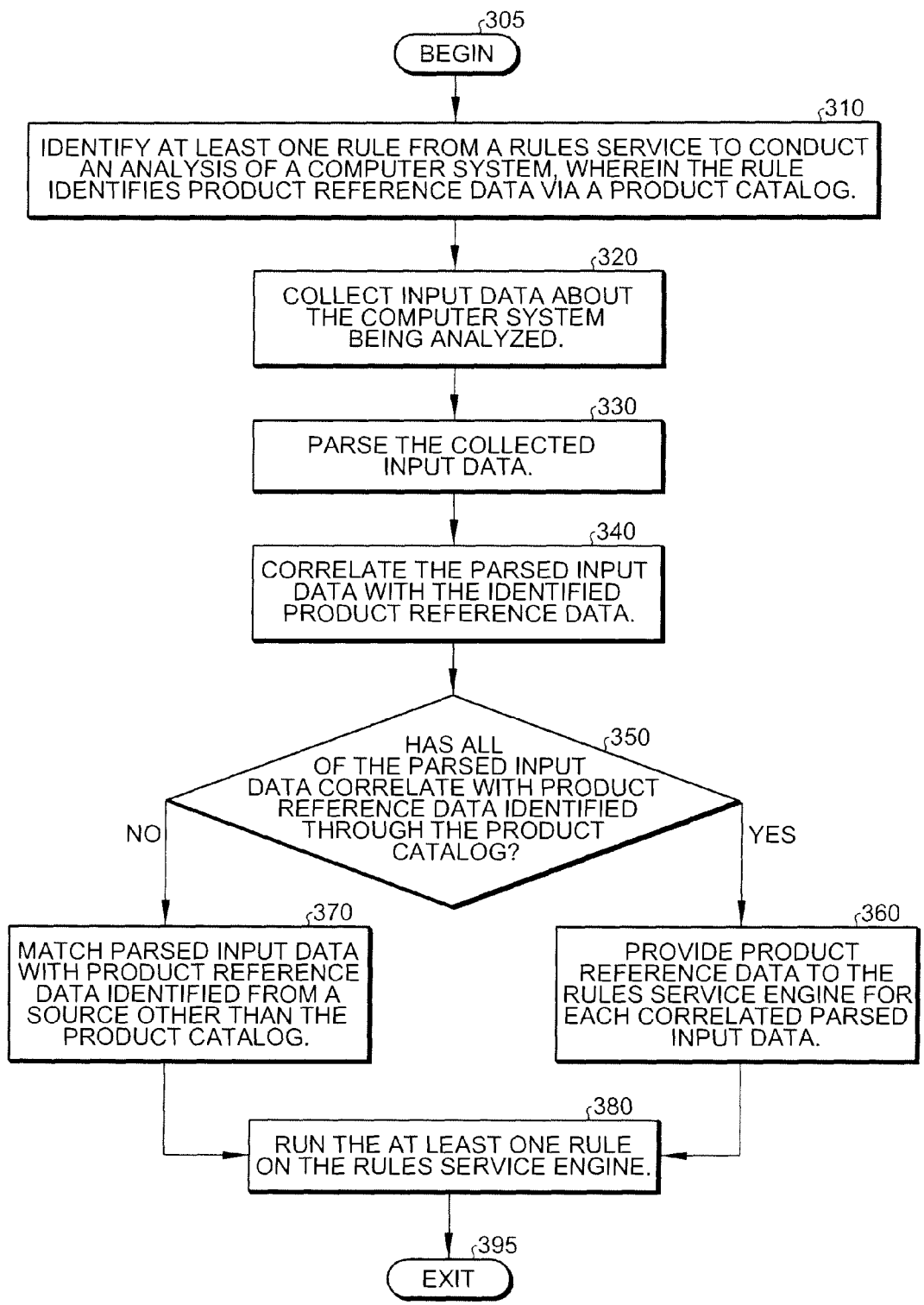
FIG. 3 shows a flow diagram of one method embodiment of the present invention for conducting a rules service analysis of a computer system using a product catalog.

FIG. 3 is a flowchart illustrating methods of implementing an exemplary process for conducting a rules service using a product catalog. In the following description, it will be understood that each block of the flowchart illustrations, and combinations of blocks in the flowchart illustrations, can be a computer program product and can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The flow diagram of FIG. 3 is of one method embodiment of the present invention for conducting a rules service analysis of a computer system using a product catalog. The analysis begins 305 by a system administrator or manager selecting 310 one or more rules from a rule repository. The system administrator or manager may also create a rule to conduct a desired analysis and submit it to the rules service for execution. The actual construction, review, and rating of rules is the subject of other inventions that are related to the present invention. Once the rule has been selected, the designated rule(s) or rules set, communicates with the product catalog to ascertain whether the components named in the rule are listed in the product catalog. As the product catalog lists the products not only by their engineering designation but also by names that are typically used by businessman, marketing personnel, sales individuals and others in the organization, the product catalog serves as a central resource whereby to maintain vital information about a product that possesses numerous designations.

Once identified in the rule and correlated with a listing in the product catalog, the product catalog returns to the rules service product reference data about those identified components. As the rule identifies a component that is significant in a conditional examination of a computer system, the rules service needs to ascertain technical aspects about the product such as telemetry specifications so as to gain important information from the computer system. As one skilled in the art can appreciate, a computer system produces vast amounts of telemetry in multiply formats. The rules selected to conduct a particular analysis are only interested in a small fraction of that information that is directly related to particular components. One aspect of the product catalog is to provide to the rules service with information to enable the rules service to conduct its analysis efficiently. For example, a rule may require the analysis of telemetry data from a Sun Fire 6800. The product catalog listing of the Sun Fire 6800 can provide the rules service with information about the telemetry data produced by the Sun Fire 6800. Thus, when data arrives from the computer system for analysis the rules service is keyed to look for and examine the proper data. Lacking such information, the rules service would have to search or explore other referential data to ascertain the characteristics and key factors associated with the Sun Fire 6800.

Once the rules service has been provided 310 with the necessary product reference data from the product catalog, input data from the computer system of interest is collected 320. The input is parsed 330 using a parser service to identify key structural features and characteristics. The parsed input data is thereafter correlated 340 with the product reference data provided to the rules service by the product catalog. When there is a one to one correlation 350 the rules service can provide 360 the reference data and parsed input data to the rules engine which can thereafter conduct 380 the analysis requested by the system administrator.

When the correlation between the parsed input data and the product reference data provided by the product catalog is not one, the rules service sets out to match 370 the parsed input data with product reference data obtained from other sources. In one embodiment of the present invention the search for other product reference data occurs by examining other entries in the product catalog. In another embodiment of the present invention the rules service searches other referential sources beyond the product catalog for a match to the parsed input data. Again, once a match is found and the product reference data is identified, the rule is run on the rules engine 380 and the results returned to the system administrator. When the rules service is required to explore either the product catalog for a match to the parsed input data or search outside the product catalog in other referential sources, another aspect of the present invention updates the product catalog based on the results of that search. When, for example, the designation of a component by the system administrator was such that it was not found in the product catalog thus necessitating the rules service to match parsed input data with product reference data from another entry in the catalog, that entry in the catalog is updated with the reference originally used by the system administrator. That new designation is added to the other designations of that particular product so that in the future, should such a designation be used again, a similar search will not be necessary.

Similarly, when the rules service is required to conduct a search outside the product catalog to identify product reference data matching parsed input data, one aspect of the present invention is the means to create a new entry in the product catalog based on the results of that search. The new entry not only includes how the product was referenced by the system administrator but also the characteristics and structure of the parsed input data, i.e. the telemetry that can be expected from that particular product. The new entry in the catalog again serves to preclude such a search from occurring in the future should that designation be used again. Furthermore, as there is now an entry in the catalog possessing particulars regarding that product, the entry in the catalog can begin to build other pseudonyms or references to that product thus expanding the entry versatility.

A rules service using a product catalog as its primary source of product reference data allows the rules service to conduct its analysis much more efficiently and expend significantly less computer resources. Results from the analysis can be returned in the matter of minutes as opposed to days. The timely delivery of risk related knowledge is vital to the installation and maintenance of computer systems. Preemptive identification of these issues enables a business to mitigate its risk and improve overall system performance.

While the invention has been particularly shown and described with reference to a preferred embodiment thereof, it will be understood by those skilled in the art that various other changes in the form and details may be made without departing from the spirit and scope of the invention. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method for performing risk analysis of a computer system including a plurality of components, comprising:

in memory, storing a product catalog storing product reference data for the components of the computer system;

with a computer device, running a rules service engine for applying rules to the computer system;

identifying one of the rules to the rules service engine, wherein the identified rule is associated with a set of components for analysis of the identified rule;

using the rules service engine to communicate with the product catalog to retrieve a set of contributing factors associated with each of the components in the set of analysis components;

collecting input data from the set of analysis components in the computer system;

executing the identified rule based on the collected input data and based on the set of contributing factors; and prior to the collecting of the input data, determining the set of contributing factors is incomplete for a particular component in the set of analysis components with regard to data needed to perform the executing of the identified rule and, in response, accessing one or more referential sources to identify data associated with the particular component, wherein the executing of the identified rule is further based on the identified data from the referential sources.

2. The method of claim 1, wherein the contributing factors includes at least one of the following data types operating system version supported by a component, telemetry information expected from a component, or whether a component is explorer compatible.

3. The method of claim 1, further comprising prior to executing the identified rule, operating the rules service engine to access a reference database to obtain additional information associated with at least one component in the set of analysis components needed for running the rule, wherein the executing of the identified rule is further based on the additional information.

* * * * *